(12) United States Patent
Kubota

(10) Patent No.: US 11,528,459 B2
(45) Date of Patent: Dec. 13, 2022

(54) PROJECTOR CONTROLLING METHOD, PROJECTOR, AND PROJECTION SYSTEM

(71) Applicant: SEIKO EPSON CORPORATION, Tokyo (JP)

(72) Inventor: Shinji Kubota, Ina (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/216,774

(22) Filed: Mar. 30, 2021

(65) Prior Publication Data

US 2021/0306604 A1 Sep. 30, 2021

(30) Foreign Application Priority Data

Mar. 30, 2020 (JP) .............................. JP2020-059820

(51) Int. Cl.
*H04N 9/31* (2006.01)
*H04N 9/64* (2006.01)
*G03B 21/26* (2006.01)
*G03B 21/14* (2006.01)

(52) U.S. Cl.
CPC ......... *H04N 9/3185* (2013.01); *G03B 21/142* (2013.01); *G03B 21/26* (2013.01); *H04N 9/64* (2013.01)

(58) Field of Classification Search
None
See application file for complete search history.

(56) References Cited

U.S. PATENT DOCUMENTS 6,554,431 B1 * 4/2003 Binsted .................... H04N 5/74
353/69
8,736,774 B1 5/2014 Narikawa

FOREIGN PATENT DOCUMENTS

| JP | 2000-352761 A | 12/2000 |
|----|---------------|---------|
| JP | 2010-124061 A | 6/2010  |
| JP | 2014-103518 A | 6/2014  |
| JP | 2015-179182 A | 10/2015 |

* cited by examiner

*Primary Examiner* — Toan Ton
*Assistant Examiner* — Danell L Owens
(74) *Attorney, Agent, or Firm* — Dority & Manning, P.A.

(57) ABSTRACT

A projector controlling method includes projecting image light on a screen on which at least three markers are placed in one direction along a curved projector surface to form a projection image and adjusting the projection position based on a captured image of the projection image and the markers which is captured by a camera in such a way that positions on the outer edge of a projection area of the projection image substantially coincide with the positions of the markers.

20 Claims, 8 Drawing Sheets

PROJECTOR CONTROLLING METHOD, PROJECTOR, AND PROJECTION SYSTEM

The present application is based on, and claims priority from JP Application Serial Number 2020-059820, filed Mar. 30, 2020, the disclosure of which is hereby incorporated by reference herein in its entirety.

BACKGROUND

1. Technical Field

The present disclosure relates to a projector controlling method, a projector, and a projection system.

2. Related Art

There is a known technology for adjusting a projection image display state by placing markers on a projection surface (see JP-A-2015-179132, for example).

For example, the projector described in JP-A-2015-179182, which uses markers having predetermined reflection or transmission characteristics provided on a projection surface, includes a radiator that radiates light according to the reflection or transmission characteristics of the markers, a detector that detects the light radiated by the radiator and reflected off the projection surface and the markers, and an adjuster that adjusts a projection image display state based on the reflected light.

The projector described in JP-A-2015-179162, however, cannot properly adjust the projection image display state in some cases when the projection surface is curved.

SUMMARY

A projector controlling method according to an aspect that solves the problem described above includes projecting image light on a screen on which at least three markers are placed in one direction along a curved projector surface to form a projection image and adjusting a projection position based on a captured image of the projection image and the markers which is captured by a camera in such a way that positions on an outer edge of a projection area of the projection image substantially coincide with positions of the markers.

A projector according to another aspect that solves the problem described above includes a projection section that projects image light on a projection surface of a screen, a camera that captures an image of an area containing the projection surface, a processor programmed to cause the projection section to project the image light on the projection surface of the screen, on which at least three markers are placed in one direction along the projection surface, which is curved, to form a projection image, cause the camera to capture an image of the projection image and the markers to generate a captured image and adjust a projection position based on the captured image in such a way that positions on an outer edge of a projection area of the projection image substantially coincide with positions of the markers.

A projection system according to still another aspect that solves the problem described above includes a screen on which at least three markers are placed in one direction along a curved projection surface, a projector that projects image light on the screen to form a projection image, and an camera that captures an image of the projection image and the markers to generate a captured image, and the projector adjusts a projection position based on the captured image in such a way that positions on the outer edge of the projection area of the projection image substantially coincide with the positions of the markers.

DESCRIPTION OF EXEMPLARY EMBODIMENTS

An embodiment will be described below with reference to the drawings.

Figure 1:
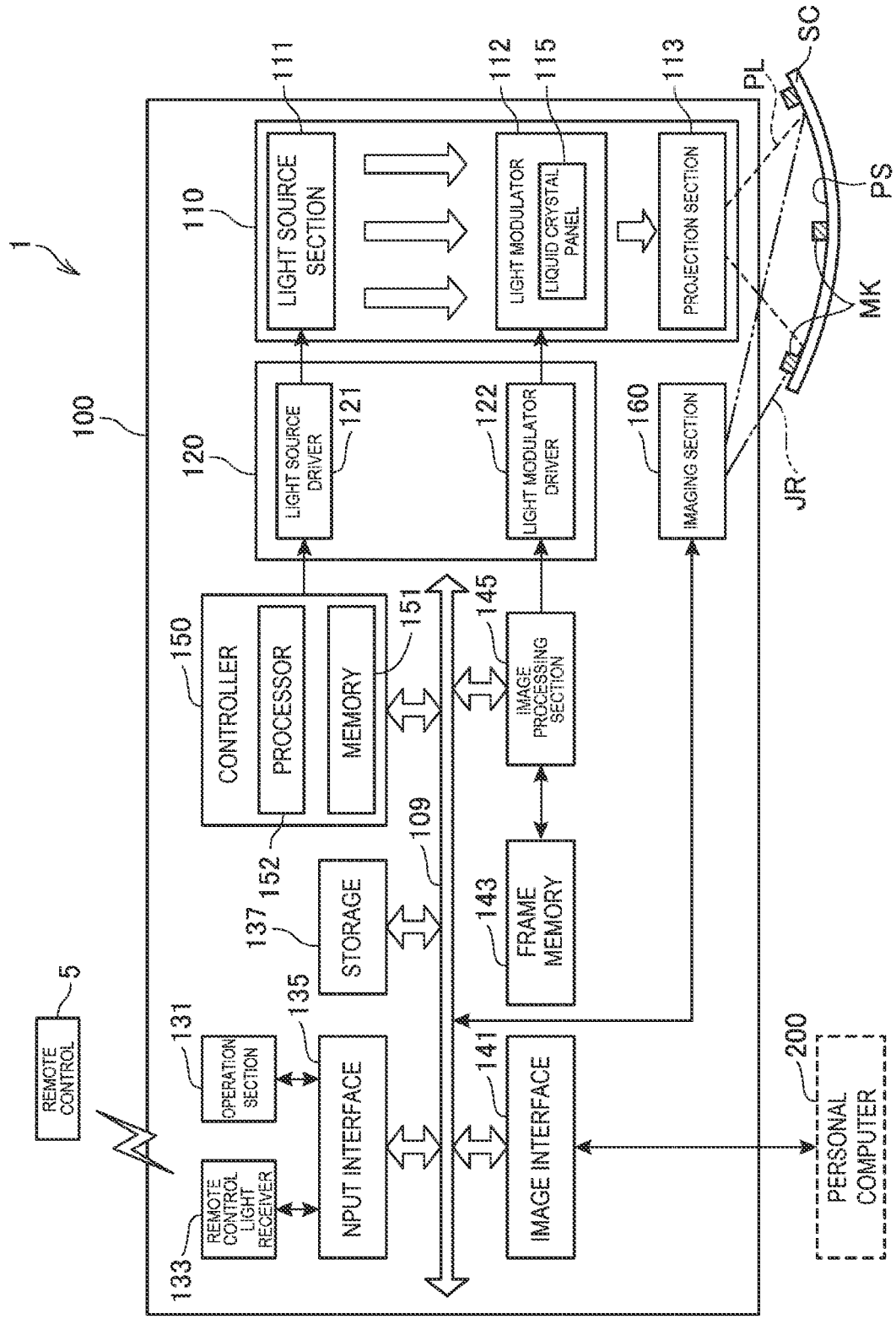
FIG. 1 shows an example of the configuration of a projection system according to an embodiment of the present disclosure.

FIG. 1 shows an example of the configuration of a projection system 1 according to the present embodiment. The projector system 1 includes a projector 100 and a screen SC, on which markers MK are placed.

The projector 100 is communicably coupled to a personal computer 200. The projector 100 receives image information from the personal computer 200.

The projector 100 receives image information from the personal computer 200 and displays an image corresponding to the received image information on a projection surface PS of the screen SC.

The projector 100 is installed in front of the screen SC. For example, the projector 100 is so installed as to be suspended from a ceiling.

Figure 3:
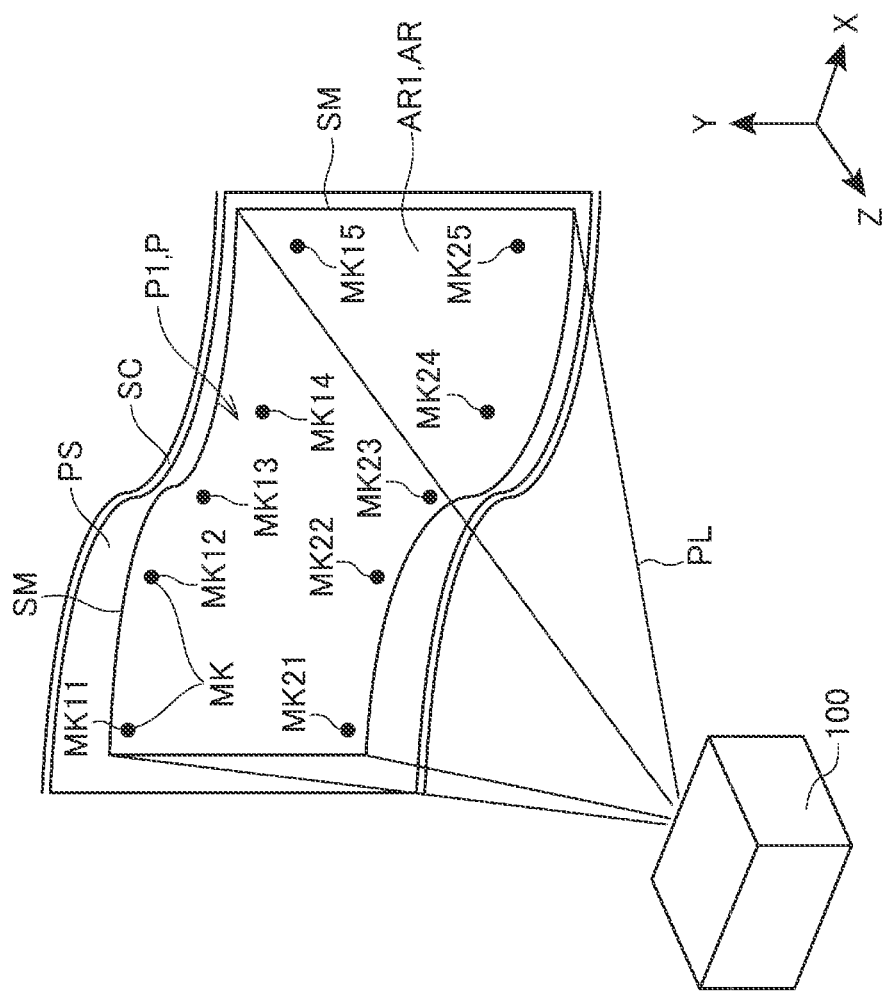
FIG. 3 is a perspective view showing an example of an initial state of the projection performed by a projector.
Figure 4:
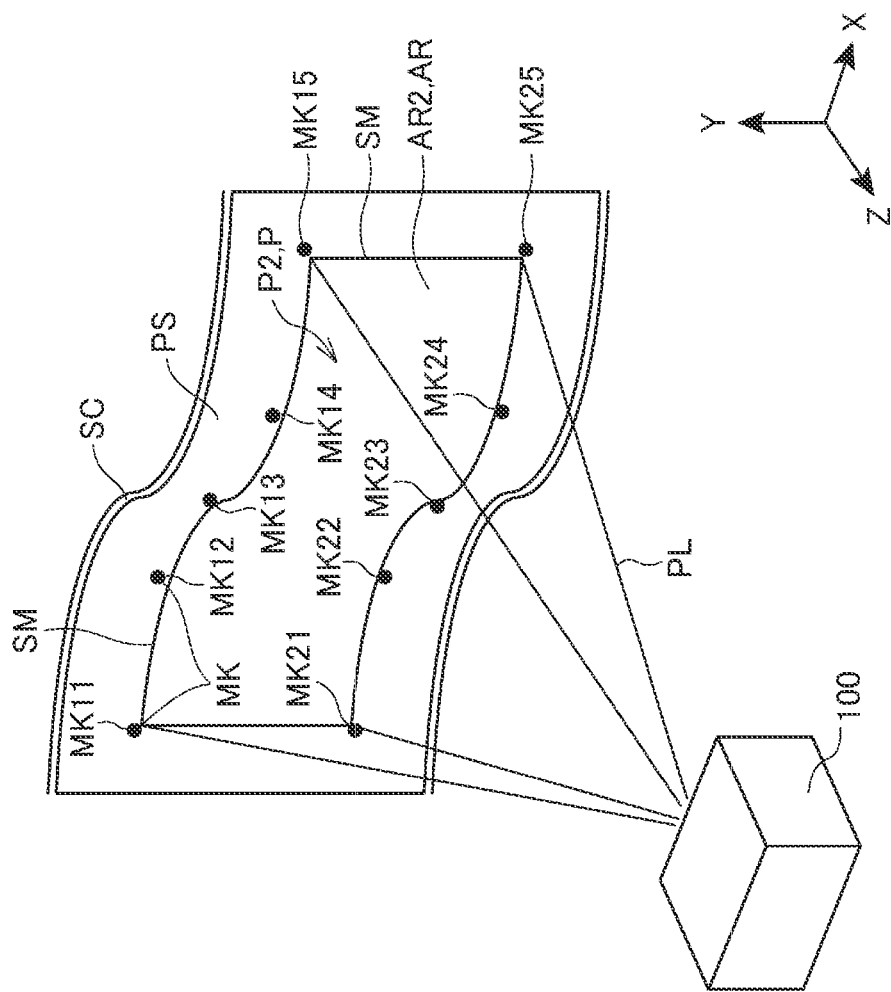
FIG. 4 is a perspective view showing an example of the state of the projection performed by the projector after adjustment.
Figure 5:
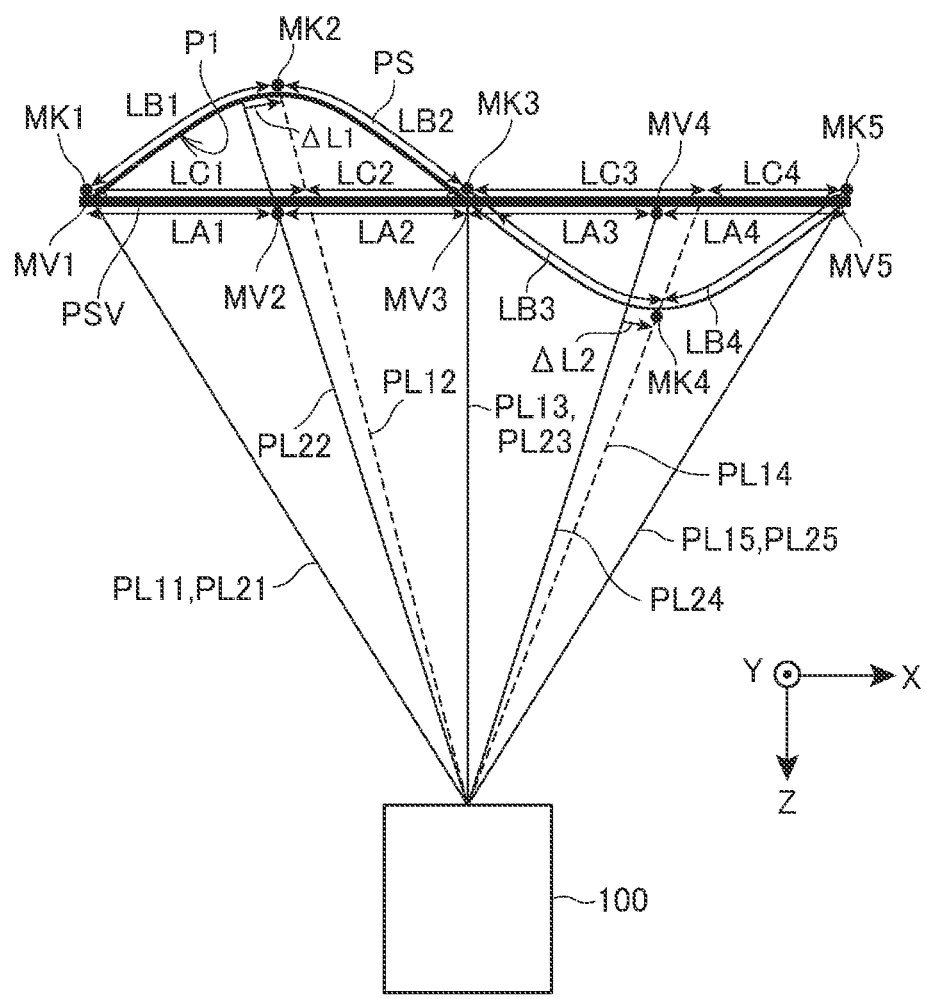
FIG. 5 is a plan view showing an example of a method for adjusting a projection position in an axis-X direction.

In the present embodiment, the projection surface PS of the screen SC is curved along an axis-X direction by way of example, as shown in FIGS. 3 to 5, and the projection surface PS of the screen SC may be curved along one direction. The situation in which "the projection surface PS is curved along an axis-X direction" represents that the projection surface PS is displaced in an axis-Z direction with respect to a plane X-Y by the same amount at the points having the same coordinate X, that is, along a straight line parallel to an axis Y. For example, the projection surface PS of the screen SC may instead be curved in the axis-Y direction. Still instead, the projection surface PS of the screen SC may be curved in an S-letter-like shape or in an arcuate shape. FIG. 1 diagrammatically shows the screen SC in which the projection surface PS is arcuately curved and three markers MK are placed at the bottom and the periphery of the arcuate shape along one direction.

The personal computer 200 is coupled to the projector 100, for example, via an HDMI (registered trademark) cable. That is, the personal computer 200 is so coupled to the projector 100 as to be capable of communicating therewith in compliance with the HDMI (high-definition multimedia interface) standard.

The projector 100 includes a projection section 110 and a driver 120, which drives the projection section 110. The projection section 110 forms an optical image and projects the optical image on the screen SC.

The projection section 110 includes a light source section 111, a light modulator 112, and a projection system 113. The driver 120 includes a light source driver 121 and a light modulator driver 122.

The light source section 111 includes a solid-state light source, such as an LED (light emitting diode) and a laser light source, or a phosphor light source, such as a phosphor element.

The light source section 111 may include a reflector and an auxiliary reflector that guide the light outputted from the light source to the light modulator 112. The light source section 111 may further include, for example, the following optical elements for enhancing the optical characteristics of the projection light: a lens group; a polarizer; and a light adjusting element that is disposed in the path to the light modulator 112 and attenuates the amount of light outputted by the light source.

The light source driver 121 is coupled to an internal bus 109 and turns on and off the light source of the light source section 111 in accordance with an instruction from a controller 150 coupled to the internal bus 109.

The light modulator 112 includes, for example, three liquid crystal panels 115 corresponding to the three primary colors, R, G, and B. The characters R, G, and B represent red, green, and blue, respectively. That is, the light modulator 112 includes a liquid crystal panel 115 corresponding to the R light, a liquid crystal panel 115 corresponding to the G light, and a liquid crystal panel 115 corresponding to the B light.

The light outputted by the light source section 111 is separated into three color light fluxes or the R light, the G light, and the B light, which enter the liquid crystal panels 115 corresponding thereto. The three liquid crystal panels 115 are each a transmissive liquid crystal panel and each modulate the light flux passing therethrough to produce image light PL. The image light PL having passed through each of the liquid crystal panels 115 and having therefore been modulated is combined with the others by a light combining system, such as a cross dichroic prism, and the combined image light PL exits toward the projection system 113.

The liquid crystal panels 115 correspond to an example of a "light modulation section."

The embodiment of the present disclosure will be described with reference to the case where the light modulator 112 includes transmissive liquid crystal panels 115 as light modulation devices, but the embodiment of the present disclosure does not necessarily employ the configuration described above. The light modulation devices may instead be reflective liquid crystal panels.

The light modulator 112 is driven by the light modulator driver 122. The light modulator driver 122 is coupled to an image processing section 145.

Image data corresponding to the RGB primary colors are inputted from the image processing section 145 to the light modulator driver 122. The light modulator driver 122 converts the inputted image data into data signals suitable for the operation of the liquid crystal panels 115. The light modulator driver 122 applies voltage to each pixel of each of the liquid crystal panels 115 based on the data signals as a result of the conversion to draw an image on the liquid crystal panel 115.

The projection system 113 includes a lens, a mirror, and other components that bring the incident image light PL into focus on the screen SC. The image light PL represents image light projected by the projection system 113.

The projection system 113 may further include, for example, a zoom mechanism that enlarges or reduces an image to be projected on the screen SC and a focus adjustment mechanism that performs focus adjustment.

The projector 100 further includes an operation section 131, a remote control light receiver 133, an input interface 135, a storage 137, an image interface 141, a frame memory 143, an image processing section 145, the controller 150, and an imaging section 160. The input interface 135, the storage 137, the image interface 141, the image processing section 145, the controller 150, and the imaging section 160 are so coupled to each other via the internal bus 109 as to be capable of data communication.

The operation section 131 includes a variety of buttons and switches provided at the surface of an enclosure of the projector 100, generates an operation signal corresponding to operation performed on any of the buttons and switches, and outputs the generated operation signal to the input interface 135. The input interface 135 outputs the operation signal inputted from the operation section 131 to the controller 150.

The remote control light receiver 133 receives an infrared signal transmitted from a remote control 5 and decodes the received infrared signal to generate an operation signal. The remote control light receiver 133 outputs the generated operation signal to the input interface 135. The input interface 135 outputs the operation signal inputted from the remote control light receiver 133 to the controller 150.

The storage 137 is a nonvolatile storage device, for example, a hard disk drive and an SSD (solid-state drive). The storage 137 stores, for example, a program executed by the controller 150, data processed by the controller 150, and the image data.

The image interface 141 includes a connector and an interface circuit and is configured to be connectable via a wire to the personal computer 200, which supplies the projector 100 with image data. In the embodiment of the present disclosure, the image interface 141 is, for example, an interface for transmitting and receiving the image data and other pieces of information to and from the personal computer 200 in compliance with the HDMI standard.

The image interface 141 is communicably coupled to the personal computer 200 via an HDMI cable.

The controller 150 includes a memory 151 and a processor 152.

The memory 151 is a storage device that stores a program executed by the processor 152 and data processed by the processor 152 in a nonvolatile manner. The memory 151 is formed of a magnetic storage device, a semiconductor storage device, such as a flash ROM (read only memory), or any other type of nonvolatile storage device. The memory 151 may include a RAM (random access memory) that forms a work area for the processor 152. The memory 151 stores data to be processed by the controller 150 and a control program executed by the processor 152.

The processor 152 may be formed of a single processor, or a plurality of processors may function as the processor 152. The processor 152 executes the control program to control each portion of the projector 100. For example, the processor 152 outputs an instruction of execution of image processing corresponding to operation accepted by the operation section 131 or the remote control 5 and parameters used in the image processing to the image processing section 145. The parameters contain, for example, a geometric correction parameter for correcting geometric distortion of an image to be projected on the screen SC. The processor 152 further controls the light source driver 121 to control the operation of turning on and off the light source section 111 and adjust the luminance of the light from the light source section 111.

The image processing section 145 and the frame memory 143 can be formed, for example, of an integrated circuit. The image processing section 145 may be the combination of a processor and an integrated circuit.

The image processing section 145 develops the image data inputted from the image interface 141 in the frame memory 143. The frame memory 143 includes a plurality of banks. The banks each have storage capacity that allows image data corresponding to one frame to be written to the bank. The frame memory 143 is formed, for example, of an SDRAM (synchronous dynamic random access memory).

The image processing section 145 performs image processing on the image data developed in the frame memory 143, for example, resolution conversion or resizing, distortion correction, shape correction, digital zooming, and image tone and luminance adjustment.

The image processing section 145 converts an input frame frequency of the vertical sync signal into a drawing frequency to generate a vertical sync signal having the drawing frequency. The generated vertical sync signal is also called an output sync signal. The image processing section 145 outputs the generated output sync signal to the light modulator driver 122.

The imaging section 160 captures an image of a projection image projected by the projection section 110 on the screen SC to generate a captured image in accordance with an instruction from the controller 150. The imaging section 160 includes an image sensor, such as a CCD (charge-coupled device) and a CMOS (complementary MOS) device. The imaging section 160 outputs the generated captured image to the controller 150. The captured image is so adjusted as to be suitable for axes X and Y, which will be described later.

The imaging section 160 is, for example, a camera.

An image capture range JR of the imaging section 160 contains the projection image projected on the screen SC.

The present embodiment has been described with reference to the case where the imaging section 160 and the controller 150 form part of the projector 100, but the embodiment of the present disclosure does not necessarily have the configuration described above. The functions of part of the imaging section 160 and the controller 150 may be separated from those of the projector 100, and an imaging apparatus and a control apparatus having the separated functions may be provided. In this case, the projector 100 serves as a projection apparatus, and the projection apparatus, the imaging apparatus, and the control apparatus are configured to be communicable with each other. The "control apparatus" is formed, for example, of a personal computer, a tablet terminal, or a smartphone.

Figure 2:
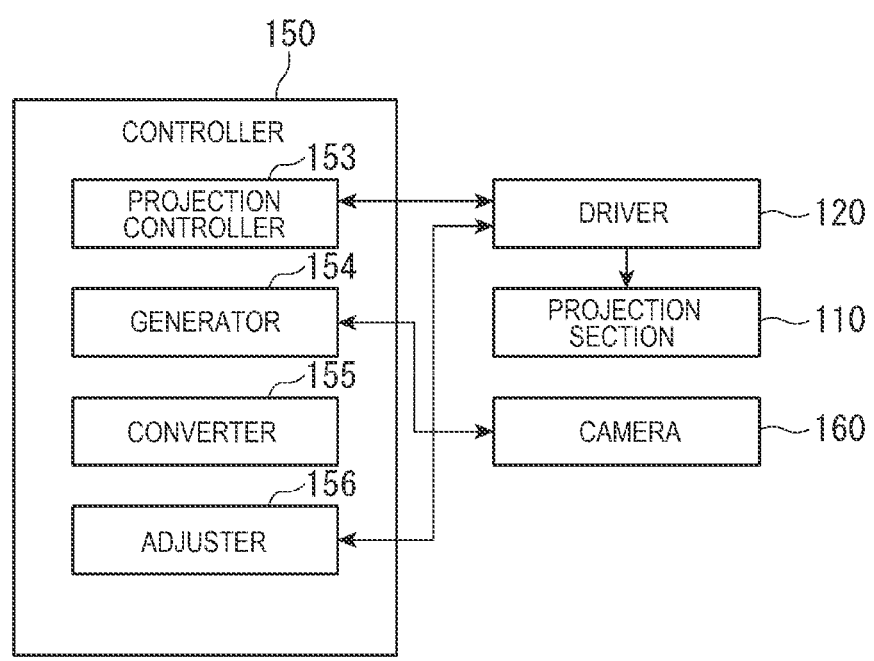
FIG. 2 shows an example of the configuration of a controller according to the present embodiment.

FIG. 2 shows an example of the configuration of the controller 150 according to the present embodiment.

The controller 150 includes a projection controller 153, a generator 154, a converter 155, and an adjuster 156, as shown in FIG. 2. Specifically, the processor 152 of the controller 150 executes the control program stored in the memory 151 to function as the projection controller 153, the generator 154, the converter 155, and the adjuster 156.

The projection controller 153 causes the projection section 110 to project the image light PL on the projection surface PS of the screen SC, on which the markers MK, which specify a projection area AR, are arranged in a row, to form a projection image P. The projection area AR represents an area where the projection image P is projected. The projection image P is, for example, a white solid image. The three markers MK arranged in a row can specify at least one side of the projection area AR having a rectangular shape.

Specifically, the projection controller 153 instructs the driver 120 to project the image light PL on the projection surface PS of the screen SC. The driver 120 causes the projection section 110 to project the image light PL on the projection surface PS in accordance with the instruction from the projection controller 153.

The markers MK and the projection area AR will be described later with reference to FIG. 3 and other figures.

The generator 154 causes the imaging section 160 to capture an image of the projection image P and the makers MK to generate a captured image JM.

Specifically, the generator 154 instructs the imaging section 160 to capture an image of the projection image P and the markers MK. The imaging section 160 captures an image of the projection image P and the markers MK in accordance with the instruction from the generator 154 to generate the captured image JM. The imaging section 160 outputs the captured image JM to the controller 150, and the generator 154 acquires the captured image JM.

The conversion section 155 detects marker coordinates corresponding to each of the markers MK in the captured image JM and converts the marker coordinates into coordinates in the coordinate system of the liquid crystal panels 155 disposed in the projection section 110.

In the following description, the coordinate system of the liquid crystal panels 115 is called a panel coordinate system in some cases.

In the present embodiment, the marker coordinates are expressed by (x, y) and the coordinates in the coordinate system of the liquid crystal panels 115 are expressed by (s, t). The coordinate x corresponds to the axis X shown in FIGS. 3 to 5, and the coordinate y corresponds to the axis Y shown in FIGS. 3 to 5. The coordinate s corresponds to an axis S shown in FIG. 6, and the coordinate t corresponds to an axis T shown in FIG. 6.

The adjuster 156 adjusts the projection position based on the captured image JM in such a way that positions on the outer edge of the projection area AR substantially coincide with the positions of the markers MK.

The situation in which "positions on the outer edge of the projection area AR substantially coincide with the positions of the markers MK" includes a situation in which "positions on the outer edge of the projection area AR coincide with the positions of the inner ends of the markers MK," as shown in FIG. 4. The situation in which "positions on the outer edge of the projection area AR substantially coincide with the positions of the markers MK" further includes a situation in which "positions on the outer edge of the projection area AR coincide with the positions of the centers of the markers MK."

Specifically, the adjuster 156 calculates the amount of adjustment corresponding to each of the markers MK by associating the marker coordinate converted into those in the panel coordinate system with coordinates of an outer edge SL of the display area of each of the liquid crystal panels 115.

Further, the adjuster 156 interpolates marker coordinates in the space between each set of two markers MK adjacent to each other out of the entire markers MK and associates the interpolated marker coordinates with coordinates of the outer edge SL of the display area of each of the liquid crystal panels 115 to calculate the amount of adjustment corresponding to the marker coordinates between the two markers MK.

The adjuster 156 adjusts the position of the projected projection image P based on the calculated amounts of adjustment.

A method for calculating the amount of adjustment will be described later with reference to FIGS. 6 and 7.

A specific example of processes carried out by the controller 150 will next be described with reference to FIGS. 3 to 7.

FIGS. 3 to 5 show the axes X, Y, and Z perpendicular to one another. The axis Y is parallel to the vertical direction, and the axes X and Z are parallel to the horizontal direction. The axis X represents the rightward/leftward direction, and the axis Z represents the frontward/rearward direction. The positive direction of the axis X corresponds to the rightward direction, the positive direction of the axis Y corresponds to the upward direction, and the positive direction of the axis Z corresponds to the frontward direction. In FIGS. 3 to 5, the screen SC having the projection surface PS curved along the axis-X direction is installed vertically, and the projector 100 is installed in front of the screen SC.

FIG. 3 is a perspective view showing an example of an initial state of the projection performed by the projector 100.

In FIG. 3, the screen SC is curved in an S-letter-like shape, and the projection surface PS is curved in the S-letter-like shape along the screen SC.

The markers MK are placed on the projection surface PS and specify a projection area AR1. The projection area AR1 represents the projection area AR where a projection image P1 is projected. In the initial projection state, a user adjusts the position where the projection image P1 is projected in such a way that the image light PL is projected on the makers MK. In other words, the user adjusts the position where the projection image P1 is projected in such a way that the markers MK are placed in the projection area AR1. The projection image P1 represents the projection image P projected in a position adjusted by the user. In FIG. 3, the initial state of the projected and displayed projection image P1 is improper. For example, the projection image P1 is displayed on the screen SC in a state in which the upper and lower outer edges of the projection area AR incline with respect to the axis-X direction and compressed and expanded in the axis-X direction.

The markers MK are placed on the projection surface PS in correspondence with the outer edge SL of the display area of each of the liquid crystal panels 115. The display area of each of the liquid crystal panels 115 corresponds to a projection area AR1, where the projection image P1 is projected. That is, the markers MK are placed on the projection surface PS in correspondence with an outer edge SM of the projection area AR1, where the projection image P1 is projected.

In the present embodiment, the number "at least three" is ten. The ten markers MK are arranged in two rows in the axis-X direction along the projection surface PS. The markers MK in the first row are formed of markers MK11, MK12, MK13, MK14, and MK15. The markers MK in the second row are formed of markers MK21, MK22, MK23, MK24, and MK25.

The five markers MK11 to MK15, which form the first row, are arranged at equal intervals. The five markers MK21 to MK25, which form the second row, are arranged at equal intervals. Specifically, the five markers MK11 to MK15 and the five markers MK21 to MK25, which form the rows, are arranged at fixed intervals along the projection surface PS.

The interval along the projection surface PS between two markers MK adjacent to each other out of the five markers MK11 to MK15, which form the first row, is equal to the interval along the projection surface PS between two markers MK adjacent to each other out of the five markers MK21 to MK25, which form the second row.

One of the five markers MK21 to MK25, which form the second row, faces one marker MK that forms the first row and is separate therefrom by a fixed distance. That is, the distance between the markers MK11 and MK21, the distance between the markers MK12 and MK22, the distance between the markers MK13 and MK23, the distance between the markers MK14 and MK24, and the distance between the markers MK15 and MK25 are equal to one another. In other words, the five markers MK11 to MK15, which forms the first row, and the markers MK21 to MK25, which form the second row, are arranged in parallel to each other along the projection surface PS.

The straight line passing through the markers MK11 and MK21, the straight line passing through the markers MK12 and MK22, the straight line passing through the markers MK13 and MK23, the straight line passing through the markers MK14 and MK24, and the straight line passing through the markers MK15 and MK25 are parallel to the axis Y.

The markers MK are each, for example, a physical marker made of a material having high recursive reflectivity. The thus configured markers MK are readily detected by the imaging section 160, which is located in a position close to the projection system 113, and the visibility of the markers MK in the other directions can be lowered.

FIG. 4 is a perspective view showing an example of the state of the projection performed by the projector 100 after the adjustment.

The adjuster 156 adjusts the projection position in such a way that positions on the outer edge SM of a projection image P2 coincide with the positions of the inner ends of the markers MK, as shown in FIG. 4. The projection image P2 represents the projection image P after the projection position is adjusted. FIG. 4 shows that the projection image P2 is displayed on the screen SC in a properly displayed state.

The inner end of each of the markers MK refers to an end close to the center of the projection image P2.

Projecting the projection image P2 as described above can prevent the markers MK from affecting the projection image P2. That is, since the markers MK are located outside a projection area AR2, where the projection image P2 is projected, effects of the markers MK on the projection image P2 can be avoided. The projection area AR2 represents the projection area AR where the projection image P2 is projected.

FIG. 5 is a plan view showing an example of a method for adjusting the projection position in the axis-X direction.

The projection image P1 is projected on the projection surface PS of the screen SC, and markers MK1, MK2, MK3, MK4, and MK5 are sequentially arranged in the axis-X direction along the projection surface PS, as shown in FIG. 5.

The marker MK1 corresponds to the markers MK11 and MK21 shown in FIGS. 3 and 4. The marker MK2 corresponds to the markers MK12 and MK22 shown in FIGS. 3 and 4. The marker MK3 corresponds to the markers MK13 and MK23 shown in FIGS. 3 and 4. The marker MK4 corresponds to the markers MK14 and MK24 shown in FIGS. 3 and 4. The marker MK5 corresponds to the markers MK15 and MK25 shown in FIGS. 3 and 4.

A distance LB1 represents the distance between the markers MK1 and MK2 along the projection surface PS. A distance LB2 represents the distance between the markers MK2 and MK3 along the projection surface PS. A distance LB3 represents the distance between the markers MK3 and MK4 along the projection surface PS. A distance LB4 represents the distance between the markers MK4 and MK5 along the projection surface PS. The distances LB1, LB2, LB3, and LB4 are equal to one another.

A projection surface PSV represents a flat virtual projection surface. The projection surface PSV is parallel to the plane X-Y. Virtual markers MV1, MV2, MV3, MV4, and MV5 represent markers virtually placed on the projection surface PSV.

A distance LA1 represents the distance between the virtual markers MV1 and MV2. A distance LA2 represents the distance between the virtual markers MV2 and MV3. A distance LA3 represents the distance between the virtual markers MV3 and MV4. A distance LA4 represents the distance between the virtual markers MV4 and MV5.

The distances LA1, LA2, LA3, and LA4 are equal to one another. That is, the virtual markers MV1 to MV5 are arranged at equal intervals.

Image light PL11 represents the image light PL projected on the marker MK1. Image light PL12 represents the image light PL projected on the marker MK2. Image light PL13 represents the image light PL projected on the marker MK3. Image light PL14 represents the image light PL projected on the marker MK4. Image light PL15 represents the image light PL projected on the marker MK5.

Image light PL21 represents the image light PL virtually projected on the virtual marker MV1. Image light PL22 represents the image light PL virtually projected on the virtual marker MV2. Image light PL23 represents the image light PL virtually projected on the virtual marker MV3. Image light PL24 represents the image light PL virtually projected on the virtual marker MV4. Image light PL25 represents the image light PL virtually projected on the virtual marker MV5.

The position where the image light PL is projected needs to be so adjusted that the image light PL from the image light PL21 to the image light PL22 is projected on the segment from the image light PL11 to the image light PL12. In other words, the projection image P1 corresponding to the image light PL from the image light PL11 to the image light PL12 is compressed in the axis-X direction, and the compressed projection image P1 is displayed.

The position where the image light PL is projected needs to be so adjusted that the image light PL from the image light PL22 to the image light PL23 is projected on the segment from the image light PL12 to the image light PL13. In other words, the projection image P1 corresponding to the image light PL from the image light PL12 to the image light PL13 is expanded in the axis-X direction, and the expanded projection image P1 is displayed.

The position where the image light PL is projected needs to be so adjusted that the image light PL from the image light PL23 to the image light PL24 is projected on the segment from the image light PL13 to the image light PL14. In other words, the projection image P1 corresponding to the image light PL from the image light PL13 to the image light PL14 is compressed in the axis-X direction, and the compressed projection image P1 is displayed.

The position where the image light PL is projected needs to be so adjusted that the image light PL from the image light PL24 to the image light PL25 is projected on the segment from the image light PL14 to the image light PL15. In other words, the projection image P1 corresponding to the image light PL from the image light PL14 to the image light PL15 is expanded in the axis-X direction, and the expanded projection image P1 is displayed.

That is, the adjuster 156 adjusts the position where the image light PL is projected by an amount of adjustment $\Delta L1$, which allows the image light PL12 to coincide with the image light PL22. The adjuster 156 further adjusts the position where the image light PL is projected by an amount of adjustment $\Delta L2$, which allows the image light PL14 to coincide with the image light PL24.

Figure 6:
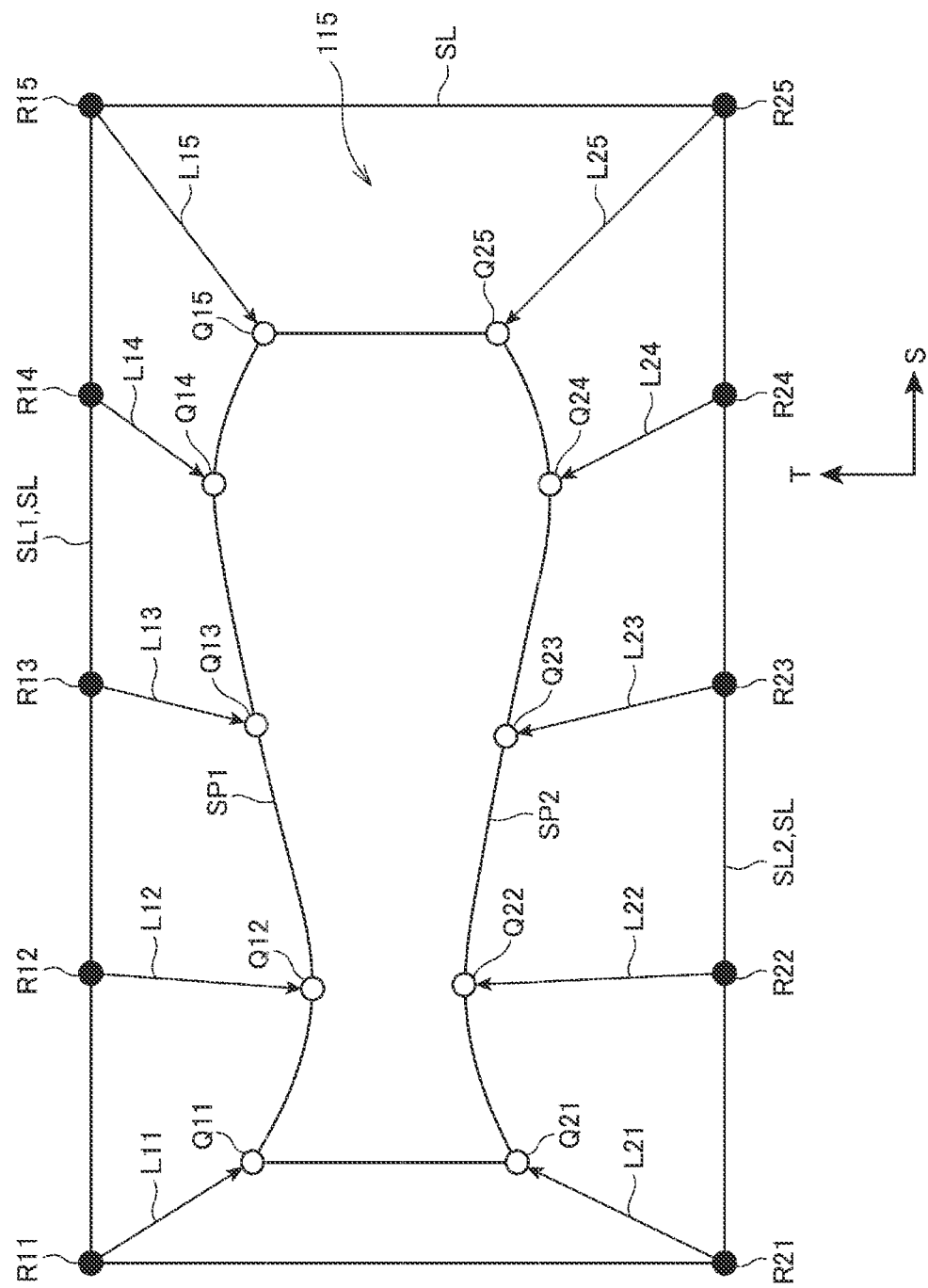
FIG. 6 shows an example of the projection position adjustment method performed by an adjuster.

FIG. 6 shows an example of the method for adjusting the projection position. FIG. 6 shows the axes S and T. The axes S and T specify the coordinate system of the liquid crystal panels 115, that is, the panel coordinate system.

The outer edge SL represents the outer edge of the display area of each of the liquid crystal panels 115.

A point Q11 corresponds to coordinates in the panel coordinate system into which the marker coordinates of the marker MK11 are converted by the converter 155. A point Q12 corresponds to coordinates in the panel coordinate system into which the marker coordinates of the marker MK12 are converted by the converter 155. A point Q13 corresponds to coordinates in the panel coordinate system into which the marker coordinates of the marker MK13 are converted by the converter 155. A point Q14 corresponds to coordinates in the panel coordinate system into which the marker coordinates of the marker MK14 are converted by the converter 155. A point Q15 corresponds to coordinates in the panel coordinate system into which the marker coordinates of the marker MK15 are converted by the converter 155.

A point Q21 corresponds to coordinates in the panel coordinate system into which the marker coordinates of the marker MK21 are converted by the converter 155. A point Q22 corresponds to coordinates in the panel coordinate system into which the marker coordinates of the marker MK22 are converted by the converter 155. A point Q23 corresponds to coordinates in the panel coordinate system into which the marker coordinates of the marker MK23 are converted by the converter 155. A point Q24 corresponds to coordinates in the panel coordinate system into which the marker coordinates of the marker MK24 are converted by the converter 155. A point Q25 corresponds to coordinates in the panel coordinate system into which the marker coordinates of the marker MK25 are converted by the converter 155.

The adjuster 156 associates the coordinates of the point OH with the coordinates of a point R11, the coordinates of the point Q12 with the coordinates of a point R12, the coordinates of the point Q13 with the coordinates of a point R13, the coordinates of the point Q14 with the coordinates of a point R14, and the coordinates of the point Q15 with the coordinates of a point R15.

The adjuster 156 associates the coordinates of the point Q21 with the coordinates of a point R21, the coordinates of the point Q22 with the coordinates of a point R22, the coordinates of the point Q23 with the coordinates of a point R23, the coordinates of the point Q24 with the coordinates of a point R24, and the coordinates of the point Q25 with the coordinates of a point R25.

The points R11 to R15 correspond to the outer edge SL of the display area of each of the liquid crystal panels 115.

Specifically, the points R11 to R15 are points on an outer edge SL1 that face the points Q11 to Q15 in the display area of each of the liquid crystal panels 115, and the points R11 and R15 correspond to the opposite ends of the outer edge SL1. The points R11 to R15 are arranged at equal intervals along the outer edge SL1.

The points R21 to R25 are points on an outer edge SL2 that face the points Q21 to Q25 in the display area of each of the liquid crystal panels 115, and the points R21 and R25 correspond to the opposite ends of the outer edge SL2. The points R21 to R25 are arranged at equal intervals along the outer edge SL2.

The adjuster 156 adjusts the position where the projection image P is projected in such a way that a point Rij (i=1, 2, J=1 to 5) is located at a point Qij. That is, the adjuster 156 adjusts by an amount of adjustment Lij the position where the point Rij is projected. The amount of adjustment Lij represents the amount of adjustment by which the point Rij in the projection image P is adjusted.

For example, the adjuster 156 adjusts the position where the projection image P is projected in such a way that the point R11 is located at the point Q11. That is, the adjuster 156 adjusts by an amount of adjustment L11 the position where the point R11 is projected. The amount of adjustment L11 represents the amount of adjustment by which the point R11 in the projection image P is adjusted.

For example, the adjuster 156 adjusts the position where the projection image P is projected in such a way that the point R12 is located at a point Q12. That is, the adjuster 156 adjusts by an amount of adjustment L12 the position where the point R12 is projected. The amount of adjustment L12 represents the amount of adjustment by which the point R12 in the projection image P is adjusted.

Since the adjuster 156 adjusts the position where the projection image P is projected in such a way that the point Rij (i=1, 2, j=1 to 5) is located at the point Qij, as described above with reference to FIG. 6, the projection position can be so adjusted that positions on the outer edge SM of the projection area AR coincide with the positions of the ten markers MK, as shown in FIG. 4.

Further, the adjuster 156 calculates interpolation curves SP1 and SP2.

The interpolation curve SP1 represents a curve passing through the points Q11 to Q15. The interpolation curve SP2 represents a curve passing through the points Q21 to Q25. The adjuster 156 uses, for example, a spline function to calculate the interpolation curves SP1 and SP2.

Figure 7:
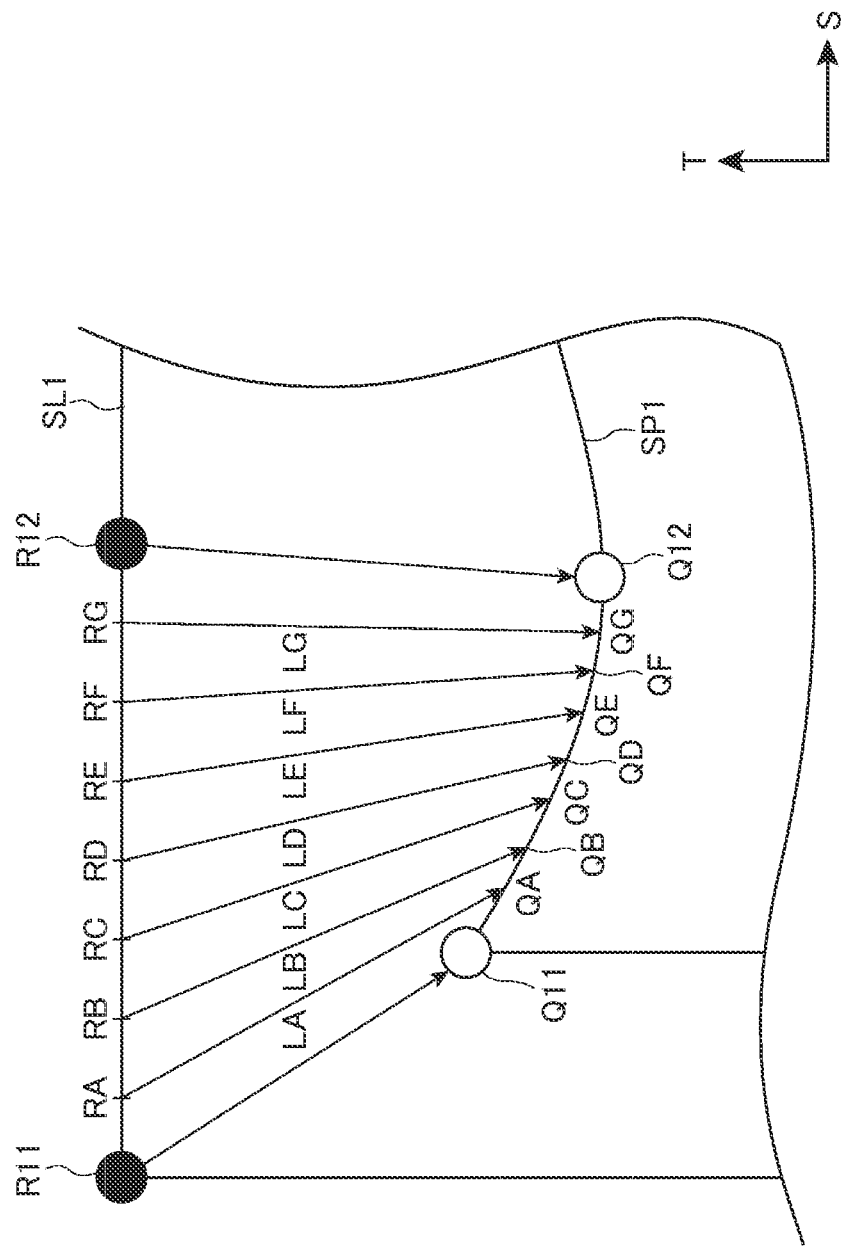
FIG. 7 shows an example of a marker coordinate interpolation method performed by the adjuster.

FIG. 7 shows an example of a method for interpolating marker coordinates.

The adjuster 156 interpolates marker coordinates in the space between two markers MK adjacent to each other and associates the interpolated marker coordinates with coordinates on the outer edge SL of the display area of each of the liquid crystal panels 115 to calculate the amount of adjustment corresponding to the marker coordinates between the two markers MK.

In FIG. 7, the description will be made, for example, of a case where the adjuster 156 performs the interpolation in the space between the points Q11 and Q12.

For example, the adjuster 156 places points QA, QB, QC, QD, QE, QF, and QG on the interpolation curve SP1 between the points Q11 and Q12. The points QA to QG are points that divide the segment between the points Q11 and Q12 along the interpolation curve SP1 into eight equal sub-segments.

The point Q11 corresponds to coordinates in the panel coordinate system into which the marker coordinates of the marker MK11 are converted by the converter 155. The point Q12 corresponds to coordinates in the panel coordinate system into which the marker coordinates of the marker MK12 are converted by the converter 155.

The adjuster 156 further places points RA, RB, RC, RD, RE, RF, and RG between the points R11 and R12 on the outer edge SL1 of the display area of each of the liquid crystal panels 115. The points RA to RG are points that divide the segment between the points R11 and R12 along the outer edge SL1 into eight equal sub-segments.

The adjuster 156 adjusts the position where the projection image P is projected in such a way that a point Rk (k=A to G) is located at a point Qk. That is, the adjuster 156 adjusts by an amount of adjustment Lk the position where the point Rk is projected. The amount of adjustment Lk represents the amount of adjustment by which the point Rk in the projection image P is adjusted.

For example, the adjuster 156 adjusts the position where the projection image P is projected in such a way that the point RA is located at the point QA. That is, the adjuster 156 adjusts by an amount of adjustment LA the position where the point RA is projected. The amount of adjustment LA represents the amount of adjustment by which the point RA in the projection image P is adjusted.

For example, the adjuster 156 adjusts the position where the projection image P is projected in such a way that the point RB is located at the point QB. That is, the adjuster 156 adjusts by an amount of adjustment LB the position where the point RB is projected. The amount of adjustment LB represents the amount of adjustment by which the point RB in the projection image P is adjusted.

As described above, since the adjuster 156 calculates the amount of adjustment corresponding to marker coordinates between two markers MK, the position where the projection image P is projected can be properly adjusted.

In FIG. 7, the description has been made of the case where the segment between two adjacent markers MK are divided into eight equal sub-segments, but the embodiment of the present disclosure is not limited to the case described above. The segment between two adjacent markers MK may be divided into N equal sub-segments. The integer N may be greater than or equal to nine. The greater the integer N is, the more properly the position where the projection image P is projected can be adjusted.

The description has further been made of the case where the adjuster 156 uses a spine function to calculate the interpolation curves SP1 and SP2, but the embodiment of the present disclosure is not limited to the case described above. The adjuster 156 only needs to calculate the interpolation curves SP1 and SP2. The adjuster 156 may uses, for example, the least squares method to calculate the interpolation curves SP1 and SP2.

Figure 8:
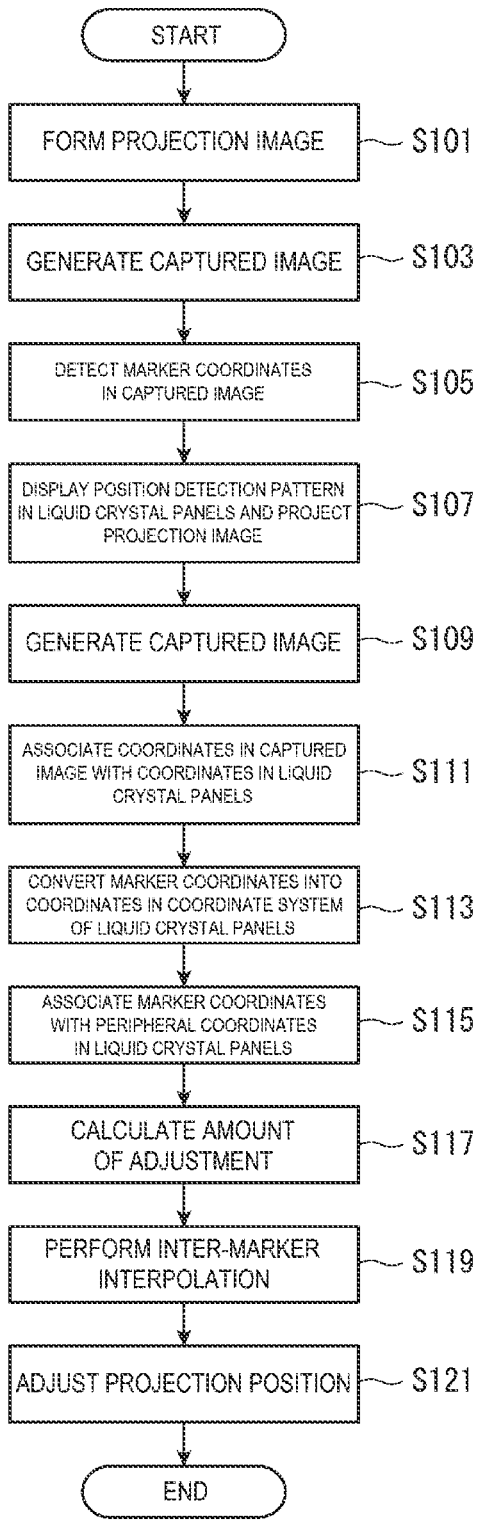
FIG. 8 is a flowchart showing an example of processes carried out by the projector.

FIG. 8 is a flowchart showing an example of presses carried out by the projector 100.

In step S101, the projection controller 153 causes the projection section 110 to project the image light PL on the projection surface PS of the screen SC, on which the markers MK are placed, to form the projection image P, as shown in FIG. 8.

In step S103, the generator 154 then causes the imaging section 160 to capture an image of the projection image P and the makers MK to generate the captured image JM.

In step S105, the converter 155 then detects marker coordinates corresponding to each of the markers MK in the captured image JM.

In step S107, the projection controller 153 then display a position detection pattern in the liquid crystal panels 115 and causes the projection section 110 to project the image light PL on the projection surface PS of the screen SC to form the projection image P.

In step S109, the generator 154 then causes the imaging section 160 to capture an image of the projection image P and the makers MK to generate the captured image JM.

In step S111, the converter 155 then associates the coordinates in the captured image JM with the coordinates in the liquid crystal panels 115.

In step S113, the converter 155 then converts the marker coordinates into coordinates in the coordinate system of the liquid crystal panels 115 disposed in the projection section 110.

In step S115, the adjuster 156 then associates the marker coordinates converted into those in the panel coordinate system with coordinates on the outer edge SL of the display area of each of the liquid crystal panels 115.

In step S117, the adjuster 156 then calculates the amount of adjustment corresponding to each of the markers MK.

In step S119, the adjuster 156 then interpolates marker coordinates in the space between two markers MK adjacent to each other out of the entire markers MK and associates the interpolated marker coordinates with coordinates on the outer edge SL of the display area of each of the liquid crystal panels 115 to calculate the amount of adjustment corresponding to the marker coordinates between the two markers MK.

In step S121, the adjuster 156 then adjusts based on the calculated amount of adjustment the position where the projection image P is projected. The processes are then terminated.

Step S101 corresponds to an example of a "projection step." Step S103 corresponds to an example of a "generation step." Steps S105 and S111 correspond to an example of a "conversion step." Steps S115 to S121 correspond to an example of an "adjustment step."

As described above with reference to FIGS. 1 to 8, the method for controlling the projector 100 according to the present embodiment is a method for controlling the projector 100 including the projection section 110 and the imaging section 160, and the method includes the projection step of causing the projection section 110 to project the image light PL on the screen SC, on which at least three markers MK are placed in the axis-X direction along the curved projector surface PS, to form the projection image P, the generation step of causing the imaging section 160 to capture an image of the projection image P and the markers MK to generate the captured image JM, and the adjustment step of adjusting the projection position based on the projection image P and the captured image JM in such a way that positions on the outer edge SM of the projection area AR substantially coincide with the positions of the markers MK.

The projection position is therefore so adjusted based on the captured image JM containing the projection image P and the markers MK that positions on the outer edge SM of the projection area AR substantially coincide with the positions of the markers MK, whereby the position where the projection image P is projected can be properly adjusted. Further, also when the projection surface PS is curved, the position where the projection image P is projected can be properly adjusted.

In the method for controlling the projector 100 according to the present embodiment, the projection area AR represents the area where the projection image P is projected and is specified by the markers MK.

The projection area AR is therefore specified by the markers MK, whereby the position where the projection image P is projected can be properly adjusted also when the projection surface PS is curved.

The method for controlling the projector 100 according to the present embodiment further includes the conversion step of detecting marker coordinates corresponding to each of the markers MK in the captured image JM and converting the marker coordinates into coordinates in the coordinate system of the liquid crystal panels 115 disposed in the projection section 110.

Therefore, the marker coordinates corresponding to each of the markers MK in the captured image JM are detected, and the marker coordinates are converted into coordinates in the coordinate system of the liquid crystal panels 115 disposed in the projection section 110, whereby the amount of adjustment by which the position where the projection image P is projected is adjusted can be calculated in the coordinate system of the liquid crystal panels 115.

In the method for controlling the projector 100 according to the present embodiment, in the adjustment step, the marker coordinates converted into coordinates in the coordinate system of the liquid crystal panels 115 are associated with coordinates on the outer edge SL of the display area of each of the liquid crystal panels 115 to calculate the amount of adjustment corresponding to each of the markers MK.

Therefore, the marker coordinates converted into coordinates in the coordinate system of the liquid crystal panels 115 are associated with coordinates on the outer edge SL of the display area of each of the liquid crystal panels 115 to calculate the amount of adjustment corresponding to each of the markers MK, whereby the amount of adjustment can be properly calculated. The position where the projection image P is projected can therefore be properly adjusted.

In the method for controlling the projector 100 according to the present embodiment, in the adjustment step, marker coordinates are interpolated in the space between two markers MK adjacent to each other out of the entire markers MK, and the interpolated marker coordinates are associated with coordinates on the outer edge SL of the display area of each of the liquid crystal panels 115 to calculate the amount of adjustment corresponding to the marker coordinates between the two markers MK.

The interpolated marker coordinates are associated with coordinates on the outer edge SL of the display area of each of the liquid crystal panels 115 to calculate the amount of adjustment corresponding to the marker coordinates between the two markers MK, whereby a proper amount of adjustment can be calculated in the interpolation positions. The position where the projection image P is projected can therefore be properly adjusted.

In the method for controlling the projector 100 according to the present embodiment, the markers MK are placed on the projection surface PS in correspondence with the outer edge SL of the display area of each of the liquid crystal panels 115.

The markers MK are therefore placed on the projection surface PS in correspondence with the outer edge SL of the display area of each of the liquid crystal panels 115, whereby the position where the projection image P is projected can be properly adjusted.

In the method for controlling the projector 100 according to the present embodiment, the markers MK are placed in the projection area AR.

The captured image JM therefore contains an image of the markers MK, whereby a captured image JM that readily allows calculation of the amount of adjustment can be generated.

In the method for controlling the projector 100 according to the present embodiment, the plurality of markers MK are placed at substantially equal intervals.

A captured image JM that readily allows calculation of the amount of compression and expansion adjustment can therefore be generated. Further, in each of the interpolation positions, a proper amount of adjustment can be readily calculated.

In the method for controlling the projector 100 according to the present embodiment, in the adjustment step, the projection position is so adjusted that positions on the outer edge SM of the projection image P coincide with the positions of the inner ends of the markers MK.

Effects of the markers MK on the projection image P can therefore be avoided. That is, since the markers MK are located outside the projection area AR of the projection image P, effects of the markers MK on the projection image P can be avoided.

The projector 100 according to the present embodiment includes the projection section 110, which projects the image light PL on the projection surface PS of the screen SC, the imaging section 160, which captures an image of an area containing the projection surface PS, the projection controller 153, which causes the projection section 110 to project the image light PL on the projection surface PS of the screen SC, on which at least three markers MK are placed in the axis-X direction along the curved projection surface PS, to form the projection image P, the generator 154, which causes the imaging section 160 to capture an image of the projection image P and the markers MK to generate the captured image JM, and the adjuster 156, which adjusts the projection position based on the captured image JM in such a way that positions on the outer edge SM of the projection area AR of the projection image P substantially coincide with the positions of the markers MK.

The projection position is therefore so adjusted based on the captured image JM containing the projection image P and the markers MK that positions on the outer edge SM of the projection area AR substantially coincide with the positions of the markers MK, whereby the position where the projection image P is projected can be properly adjusted. Further, also when the projection surface PS is curved, the position where the projection image P is projected can be properly adjusted.

The projection system according to the present embodiment includes the screen SC, on which at least three markers MK are placed in the one direction along the curved projection surface PS, the projection apparatus, which projects the image light PL on the projection surface PS of the screen SC to form the projection image P, and the imaging apparatus, which captures an image of the projection image P and the markers MK to generate the captured image JM, and the projection apparatus adjusts the projection position based on the captured image JM in such a way that positions on the outer edge SM of the projection area AR of the projection image P substantially coincide with the positions of the markers MK.

The projection position is therefore so adjusted based on the captured image JM containing the projection image P and the markers MK that positions on the outer edge SM of the projection area AR substantially coincide with the positions of the markers MK, whereby the position where the projection image P is projected can be properly adjusted. Further, also when the projection surface PS is curved, the position where the projection image P is projected can be properly adjusted.

The present embodiment described above is a preferable embodiment. The present disclosure is, however, not limited to the embodiment described above, and a variety of variations can be embodied to the extent that the variations do not depart from the substance of the present disclosure.

For example, in the present embodiment, the markers MK are made of a material having low polarization absorptance, but the embodiment of the present disclosure does not necessarily employ the configuration described above. The markers MK only need to be distinguishable from the projection surface PS when the projection section 110 projects the image light PL on the projection surface PS of the screen SC. For example, when the projection surface PS is a white surface, the markers MK may each be a magnet colored in a color distinguishable from white, for example, red, green, blue, or black. The markers MK may each instead be formed of a reflection plate.

In the present embodiment, ten markers MK are placed on the projection surface PS of the screen SC, but the number of markers MK is not limited to ten. The markers MK only need to be so placed as to specify the projection area AR. The number of markers MK may be eleven or greater. When the projection surface PS is curved, the number of markers MK is preferably a predetermined number or greater. The predetermined number is, for example, eight. The greater the number of markers MK is, the more properly the position where the projection image P is projected can be adjusted. The smaller the number of markers MK, the shorter the period for which the controller 150 carries out the processes.

The functional portions shown in FIGS. 1 and 2 each represent a functional configuration and is not necessarily implemented in a specific form. That is, hardware corresponding to each of the functional portions is not necessarily implemented, and a single processor that executes a program can, of course, achieve the functions of the plurality of functional portions. Further, part of the functions achieved by software in the embodiment described above may be achieved by hardware, or part of the functions achieved by hardware may be achieved by software. In addition, the specific detailed configuration of each of the other portions in the projector 100 can be arbitrarily changed to the extent that the change does not depart from the substance of the present disclosure.

The process units in the flowchart shown in FIG. 6 are process units divided in accordance with the contents of the primary processes for easy understanding of the processes carried out by the controller 150. How to produce the divided process units or the names of the process units shown in the flowchart of FIG. 8 do not limit the embodiment of the present disclosure. A process carried out by the controller 150 can be further divided into a larger number of process units in accordance with the content of the process, and each of the process units can further be divided into a large number of processes. Further, the order in which the processes are carried out in the flowchart described above is not limited to that shown in FIG. 8.

The method for controlling the projector 100 can be achieved by causing the processor 152 provided in the projector 100 to execute a control program corresponding to the method for controlling the projector 100. The control program can also be recorded on a computer readable recording medium. The recording medium can be a magnetic or optical recording medium or a semiconductor memory device. Specific examples of the recording medium may include a flexible disk, an HDD, a CD-ROM (compact disk read only memory), a DVD, a Blu-ray (registered trademark) Disc, a magneto-optical disk, a flash memory, and a portable or immobile recording medium, such as a card-shaped recording medium. The recording medium may instead be a RAM, a ROM, an HDD, or any other nonvolatile storage device that is an internal storage device provided in an image processing apparatus. The control program corresponding to the method for controlling the projector 100 can be stored, for example, in a server apparatus, and the control program can be downloaded from the server apparatus to the projector 100 to achieve the method for controlling the projector 100.

What is claimed is:

1. A projector controlling method, the method comprising:
   projecting image light on a screen on which at least three markers are placed in one direction along a curved projector surface to form a projection image; and
   adjusting a projection position based on a captured image of the projection image and the markers which is captured by a camera in such a way that positions on an outer edge of a projection area of the projection image substantially coincide with positions of the markers;
   wherein the projection position is so adjusted that positions on the outer edge of the projection image coincide with positions of inner ends of the markers.

2. The projector controlling method according to claim 1, wherein the projection area represents an area where the projection image is projected and is specified by the markers.

3. The projector controlling method according to claim 1, further comprising:
   detecting marker coordinates corresponding to each of the markers in the captured image; and
   converting the marker coordinates into coordinates in a coordinate system of a light modulator.

4. The projector controlling method according to claim 3, wherein the marker coordinates converted into coordinates in the coordinate system of the light modulator are associated with coordinates on an outer edge of a display area of the light modulator to calculate an amount of adjustment corresponding to each of the markers.

5. The projector controlling method according to claim 4, wherein the marker coordinates are interpolated between two markers adjacent to each other out of the at least three markers, and the interpolated marker coordinates are associated with coordinates on the outer edge of the display area of light modulator to calculate the amount of adjustment corresponding to the marker coordinates between the two markers.

6. The projector controlling method according to claim 3, wherein the markers are placed on the projection surface in correspondence with the outer edge of the display area of the light modulator.

7. The projector controlling method according to claim 3, wherein the markers are placed in the projection area.

8. The projector controlling method according to claim 3, wherein the markers are placed at substantially equal intervals.

9. A projection system comprising:
   a screen on which at least three markers are placed in one direction along a curved projection surface;
   a projector that projects image light on the screen to form a projection image; and
   a camera that captures an image of the projection image and the markers to generate a captured image,
   wherein the projector comprises one or more processors programmed to adjust a projection position based on the captured image in such a way that positions on the outer edge of the projection area of the projection image substantially coincide with the positions of the markers; and
   wherein the one or more processors are further programmed to:
      detect marker coordinates corresponding to each of the markers in the captured image; and
      convert the marker coordinates into coordinates in a coordinate system of a light modulator;
   wherein the marker coordinates converted into coordinates in the coordinate system of the light modulator are associated with coordinates on an outer edge of a display area of the light modulator to calculate an amount of adjustment corresponding to each of the markers; and
   wherein the marker coordinates are interpolated between two markers adjacent to each other out of the at least three markers, and the interpolated marker coordinates are associated with coordinates on the outer edge of the display area of the light modulator to calculate the amount of adjustment corresponding to the marker coordinates between the two markers.

10. A projection system according to claim 9, wherein the projection area represents an area where the projection image is projected and is specified by the markers.

11. A projection system according to claim 9, wherein the markers are placed on the projection surface in correspondence with the outer edge of the display area of the light modulator.

12. A projection system according to claim 9, wherein the markers are placed in the projection area.

13. A projection system according to claim 9, wherein the projection position is so adjusted that positions on the outer edge of the projection image coincide with positions of inner ends of the markers.

14. A projection system according to claim 9, wherein the markers are placed at substantially equal intervals.

15. A projector controlling method, the method comprising:
   projecting image light on a screen on which at least three markers are placed in one direction along a curved projector surface to form a projection image;
   adjusting a projection position based on a captured image of the projection image and the markers which is captured by a camera in such a way that positions on an outer edge of a projection area of the projection image substantially coincide with positions of the markers;
   detecting marker coordinates corresponding to each of the markers in the captured image; and
   converting the marker coordinates into coordinates in a coordinate system of a light modulator;
   wherein the marker coordinates converted into coordinates in the coordinate system of the light modulator are associated with coordinates on an outer edge of a display area of the light modulator to calculate an amount of adjustment corresponding to each of the markers; and
   the marker coordinates are interpolated between two markers adjacent to each other out of the at least three markers, and the interpolated marker coordinates are associated with coordinates on the outer edge of the display area of light modulator to calculate the amount of adjustment corresponding to the marker coordinates between the two markers.

16. A projector controlling method according to claim 15, wherein the projection area represents an area where the projection image is projected aid is specified by the markers.

17. A projector controlling method according to claim 15, wherein the markers are placed on the projection surface in correspondence with the outer edge of the display area of the light modulator.

18. A projector controlling method according to claim 15, wherein the markers are placed in the projection area.

19. A projector controlling method according to claim 15, wherein the projection position is so adjusted that positions on the outer edge of the projection image coincide with positions of inner ends of the markers.

20. A projector controlling method according to claim 15, wherein the markers are placed at substantially equal intervals.

\* \* \* \* \*